United States Patent [19]

Börjesson et al.

[11] Patent Number: 4,529,300
[45] Date of Patent: Jul. 16, 1985

[54] MAGAZINE DEVICE WITH SUCTION BOXES

[76] Inventors: Staffan Börjesson, Pl. 7825, Fjärås, Sweden, 430 33; Hans Rosengren, Lundegrens gata 5F, Kungsbacka, Sweden, 434 00

[21] Appl. No.: 525,880

[22] Filed: Aug. 24, 1983

[30] Foreign Application Priority Data

Sep. 6, 1982 [SE] Sweden .................................. 8205061

[51] Int. Cl.³ ............................................... G03B 27/60
[52] U.S. Cl. ...................................... 355/73; 354/275; 242/197
[58] Field of Search ...................... 355/72, 73, 64, 54; 354/275; 352/78 R; 242/71.1, 71.2, 197

[56] References Cited

U.S. PATENT DOCUMENTS

| 3,701,495 | 10/1972 | Holliday | 242/71.2 |
| 3,702,726 | 11/1972 | Takeichi et al. | 352/72 |
| 4,070,108 | 1/1978 | Scheib | 242/71.2 |
| 4,147,427 | 4/1979 | Stewart | 355/72 |

Primary Examiner—A. A. Mathews
Attorney, Agent, or Firm—Holman & Stern

[57] ABSTRACT

A device for transferring magnified pictures to a radiation sensitive recording member, preferably for photographic pictures, comprising an opaque magazine device having unwinding and winding up housings for the recording member, such as photographic paper, that are remote operable between picture size dependent end positions. Between the housings the necessary length of the recording member is unwound as soon as the picture size has been set.

16 Claims, 8 Drawing Figures

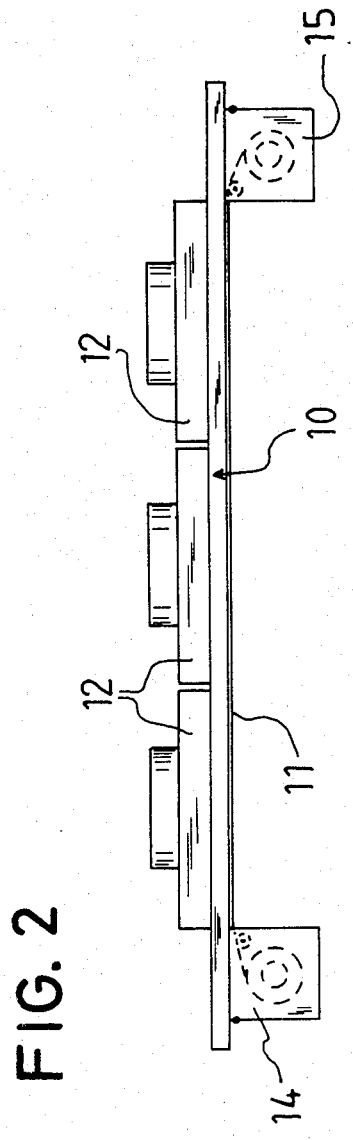
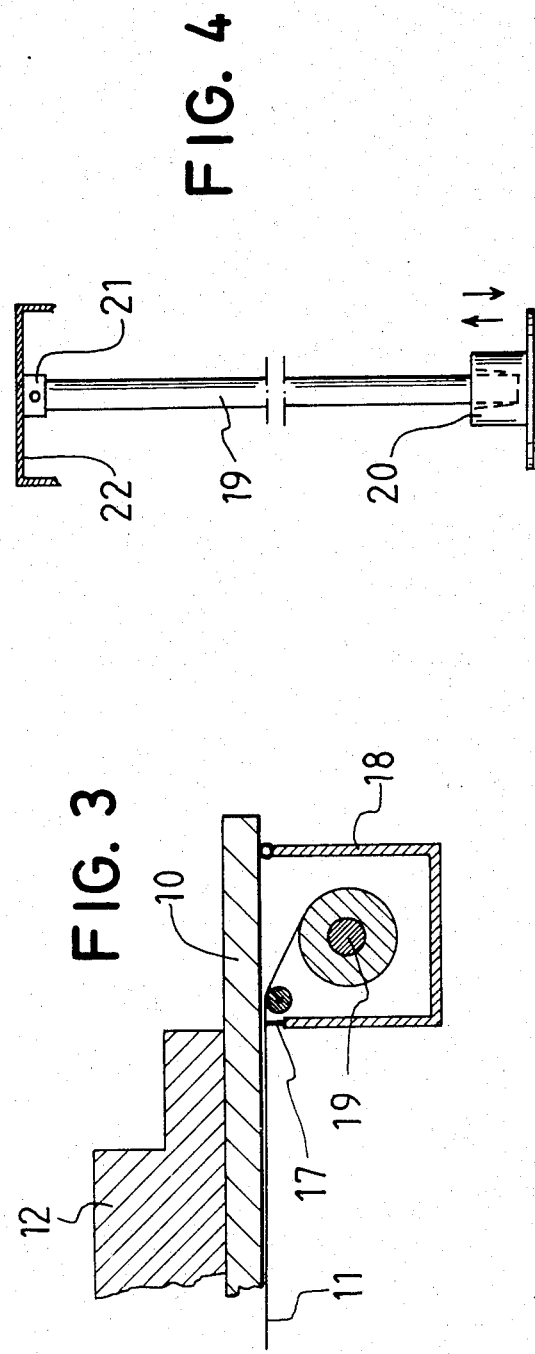

MAGAZINE DEVICE WITH SUCTION BOXES

BACKGROUND OF THE INVENTION

1. Field of the Invention

The present invention relates to a magazine device for handling of radiation sensitive recording members, preferably for photographic pictures. Specifically, the invention relates to an arrangement for large size copying of for instance color pictures.

2. Description of the Prior Art

The problem behind the invention is to improve large size copying and offer an arrangement that requires a minimum of cumbersome manual operations.

The methods used today generally involve a projection on to a wall of the desired size of the picture to be copied. Thereafter, somehow, for instance by nailing, the corner positions of the actual picture size are marked. After having carried out this, the light is switched off and the photographic paper is attached in darkness by touching the position markings (nails) previously set out. Thereafter an exposure is made and the paper is removed-still in darkness.

The drawbacks of such a process are apparent and the object of the invention is to eliminate such deficiencies.

BRIEF SUMMARY OF THE INVENTION

The invention provides a device for transferring magnified pictures to a radiation sensitive recording member, preferably for photographic pictures. The device comprises a radiation opaque magazine device housing a recording member. The magazine is provided with an unwinding and winding up arrangement that is remote operable between picture size dependent end positions. The magazine arrangement operation is such that the necessary length of a recording member is unwound as soon as the picture size has been set.

In one embodiment, at least one of the magazines is movable over a support for the recording member that has been unwound from the unwinding magazine.

In a practical and preferred embodiment, each magazine is arranged for individual as well as joint motion over the support.

The recording member operation preferably is such that the recording member is pulled out with stationary winding up magazine and moving unwinding magazine, and such that the recording member is supplied to the winding up magazine, after exposure, by moving the winding up magazine towards the unwinding magazine at the same time as the recording member supporting element of the winding up magazine is rotated.

In a practical embodiment, the magazines are arranged for movement along guides over a vertically positionable disc acting as a support for the recording member which may be held by suction to the disc.

In order to provide for an optimum handling of the recording member after exposure, the winding up magazine preferably is equipped with a driving motor for rotation of a shaft on which the recording member supporting element is attachable.

For a simple handling of the recording member, which preferably is in roll form, the recording member supporting shaft of each magazine preferably is swingably supported at the top of the magazine.

The roller is fixed preferably by dimensioning at least the shaft of the unwinding magazine to accomodate a bobbin, in which an axially settable locking element is locked.

BRIEF DESCRIPTION OF THE DRAWINGS

FIG. 2 is a top view of the device of FIG. 1;

FIG. 3 is a cross-sectional view taken along line III—III in FIG. 1;

FIG. 4 schematically shows a roller shaft suspension in the magazine housing.

DESCRIPTION OF A PREFERRED EMBODIMENT

The invention will now be described in detail with reference to the accompanying drawings.

Figure 1:
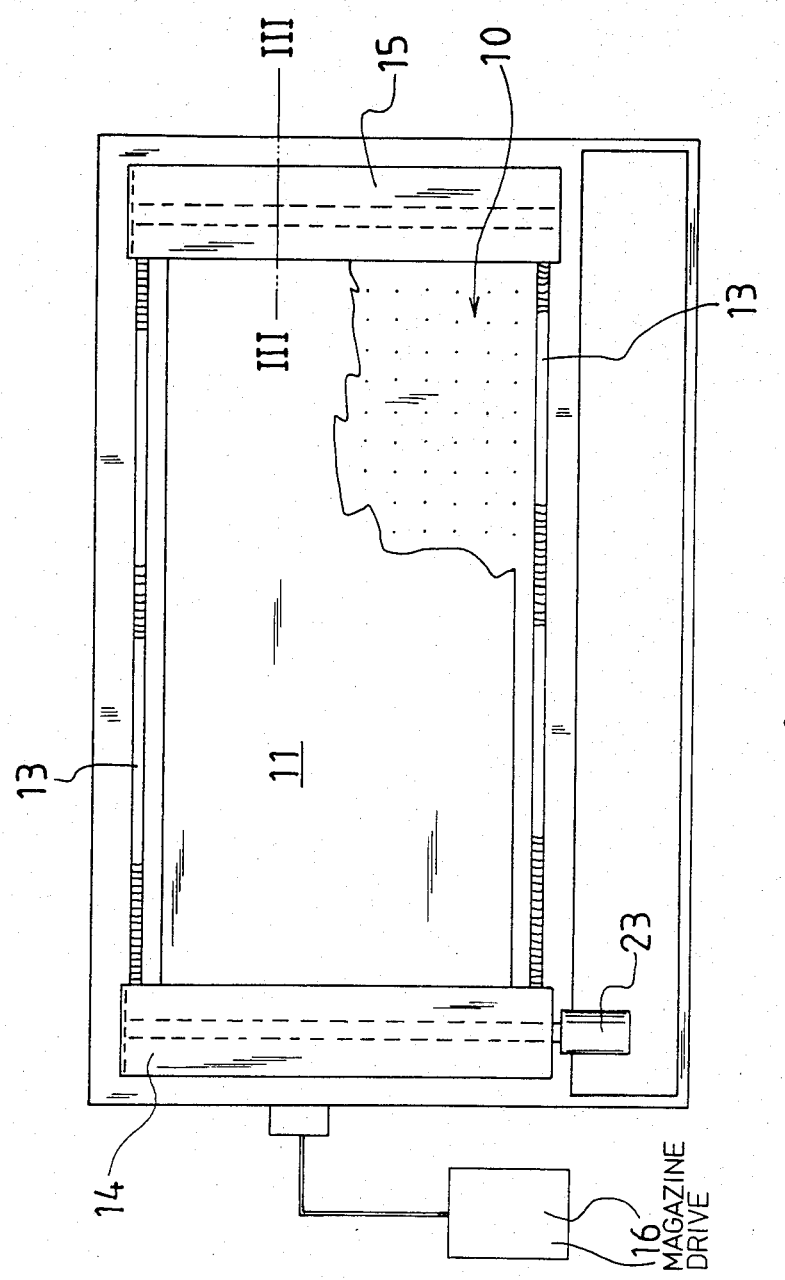
FIG. 1 is a schematic front elevational view of a device according to the invention.

The reference numeral 10 in FIG. 1 shows a perforated support arranged for being positioned vertically and acting as a support for a recording member 11 in the shape of a photographic paper. A number of suction boxes 12 co-operate with the support 10 and are arranged for maintaining the paper in a planar condition against the support.

A pair of magazines or casings 14, 15 are arranged on guides 13 formed as racks and are moved by a control and driving device 16. The driving and the control operations, respectively, are not shown in detail as known principles are to be used in different versions. However, the control and driving device 16 of the preferred embodiment comprises means for remote operation of individual magazines 14, 15 as well as several magazines 14, 15 at the same time.

Each magazine 14, 15 is light opaque and for instance has a flexible sealing lip 17 against the support 10 and a hinged cover 18. Within the cover there is arranged a shaft 19 for supporting the photographic paper. In the magazine 15, which acts as unwinding magazine, for instance, a bobbin provided roller is supported on the shaft and fixed in position by locking elements 20 insertable into the bobbin. In order to facilitate the said operation and the following handling of an unwound paper, the shafts 19 are supported for swinging motion in a hinge 21 at the magazine top 22.

The magazine 14, which acts as a winding up magazine, is provided with a driving motor 23 for rotation of the magazine shaft 19 during winding up of exposed paper.

Figure 5:
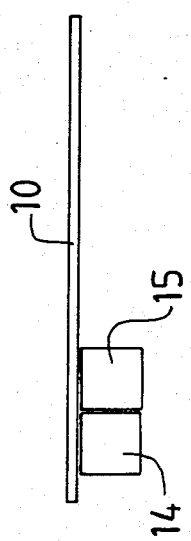
FIGS. 5 to 8 schematically show the operation principle according to the invention.
Figure 6:
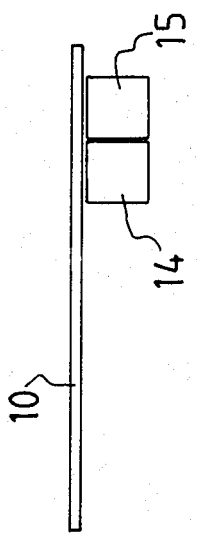

FIGS. 5–8 show a number of different operation positions for the magazine arrangement comprising the two magazines or casings, i.e. the unwinding magazine 15 and the winding up magazine 14. FIG. 5 indicates a rest position, from which the operation initially starts. Thereafter, in FIG. 6 the picture size on the support 10 is set by supplying the actual positions to the control and driving device 16 in any convenient manner, for instance by manually programming the scheme of motion of the magazine 15 on a terminal included within the unit 16.

Figure 7:
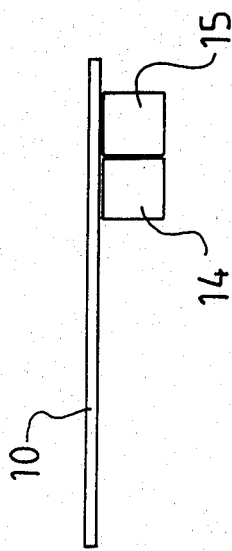
Figure 8:
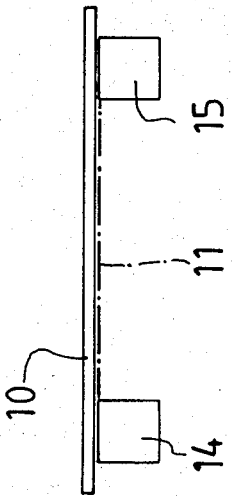

Thereafter, without any need for carrying out further manual operations, the position according to FIG. 7 is assumed, where photographic paper has been unwound between the magazines 14 and 15 in desired, picture size dependent length for allowing the necessary exposure.

When this has been done, the magazine 14 starts a movement towards right in the figure at the same time as the paper supporting shaft thereof is rotated by the motor 23 in the winding up direction. The final position after this winding up appears from FIG. 8.

Thereafter the magazines 14, 15 return to the position according to FIG. 6, if copying is to be continued, or assume the rest position according to FIG. 5 if the operation is to be terminated.

We claim:

1. A magazine type device for transferring giant size enlarged photographic pictures to photographic paper comprising:

a support member over which photographic paper is drawn;

suction means operatively associated with said support member for holding and supporting the photographic paper on the support member;

a first light opaque unwinding casing for housing wound photographic paper to be unwound;

a second light opaque winding-up casing for housing photographic paper unwound from said first casing to be wound up;

means for movably mounting said first and second casings on said support member for relative movement with respect to each other; and means for moving at least one of said casings along said support member relative to the other casing while said photographic paper is supported on said support member and setting a predetermined distance between said casings.

2. A device as claimed in claim 1 wherein said means for moving at least one of said casings comprises, means for moving both casings individually or jointly.

3. A device as claimed in claim 2 wherein said means for moving said casings comprises a control and driving device adapted to move said first unwinding casing during unwinding of the photographic paper therefrom while said second casing is stationary.

4. A device as claimed in claim 3 and further comprising:

a photographic paper support element rotatably mounted in said second casing for supporting said photographic paper wound thereon; and means to rotate said support element to wind said photographic paper thereon simultaneously with the movement of said first casing.

5. A device as claimed in claim 1 wherein said means for movably mounting said first and second casings comprises:

spaced guide racks extending over a surface of said support member; and means to movably support said casings on said guide racks.

6. A device as claimed in claim 4 wherein said means for movably mounting said first and second casings comprises:

spaced guide racks extending over a surface of said support member; and means to movably support said casing on said guide racks.

7. A device as claimed in claim 1 wherein said suction means comprises:

a plurality of perforations in spaced array through said support member;

suction boxes arranged on the surface of said support member opposite to that over which the photographic paper is drawn and communicating with said perforations; and means to produce a suction in said suction boxes.

8. A device as claimed in claim 6 wherein said suction means comprises:

a plurality of perforations in spaced array through said support member;

suction boxes arranged on the surface of said support member opposite to that over which the photographic paper is drawn and communicating with said perforations; and means to produce a suction in said suction boxes.

9. A device as claimed in claim 1 wherein said support member is planar and vertically orientated.

10. A device as claimed in claim 8 wherein said support member is planar and vertically orientated.

11. A device as claimed in claim 4 wherein said support element comprises a shaft, and said means to rotate said support element comprises a drive motor operably connected to said shaft and to said control and driving device.

12. A device as claimed in claim 10 wherein said support element comprises a shaft, and said means to rotate said support element comprises a drive motor operably connected to said shaft and to said control and driving device.

13. A device as claimed in claim 11 and further comprising:

a support element in said first casing for supporting the photographic paper to be unwound therefrom including a shaft rotatably mounted in said first casing; and means to pivotally support each of said shafts at one end thereof to the respective end of the respective casing.

14. A device as claimed in claim 12 and further comprising:

a support element in said first casing for supporting the photographic paper to be unwound therefrom including a shaft rotatably mounted in said first casing; and means to pivotally support each of said shafts at one end thereof to the respective end of the respective casing.

15. A device as claimed in claim 13 wherein said support element in said first casing further comprises;

a bobbin removably mounted on said shaft in said first casing; and a locking element removably insertable axially into one end of said bobbin and onto the respective end of said shaft in said first casing.

16. A device as claimed in claim 14 wherein said support element in said first casing further comprises;

a bobbin removably mounted on said shaft in said first casing; and a locking element removably insertable axially into one end of said bobbin and onto the respective end of said shaft in said first casing.

* * * * *